United States Patent
An et al.

(10) Patent No.: US 10,404,085 B2
(45) Date of Patent: Sep. 3, 2019

(54) VEHICLE CONSOLE ASSEMBLIES WITH DEVICE CHARGING TRAYS INCLUDING ELECTRONIC DEVICE SUPPORT FEATURES

(71) Applicant: TOYOTA MOTOR ENGINEERING & MANUFACTURING NORTH AMERICA, INC., Erlanger, KY (US)

(72) Inventors: Chae An, Northville, MI (US); Kerry Scott Zellner, Jr., Saline, MI (US)

(73) Assignee: Toyota Motor Engineering & Manufacturing North Ameica, Inc., Plano, TX (US)

( * ) Notice: Subject to any disclaimer, the term of this patent is extended or adjusted under 35 U.S.C. 154(b) by 7 days.

(21) Appl. No.: 15/658,969

(22) Filed: Jul. 25, 2017

(65) Prior Publication Data

US 2019/0036364 A1    Jan. 31, 2019

(51) Int. Cl.
*B60R 7/06* (2006.01)
*B60R 11/02* (2006.01)
*H02J 7/00* (2006.01)
*B60R 11/00* (2006.01)

(52) U.S. Cl.
CPC .............. *H02J 7/0045* (2013.01); *B60R 7/06* (2013.01); *B60R 11/02* (2013.01); *H02J 7/0052* (2013.01); *B60R 2011/0005* (2013.01)

(58) Field of Classification Search
CPC .......... H02J 7/0045; B60R 7/06; B60R 11/02; B60R 2011/0005; B60R 2011/0094
USPC ...................................................... 296/24.34
See application file for complete search history.

(56) References Cited

U.S. PATENT DOCUMENTS

| 5,823,495 | A | 10/1998 | Joss et al. |
| 5,834,920 | A | 11/1998 | Daniel |
| 6,208,734 | B1 | 3/2001 | Ortscheid et al. |
| 6,491,194 | B2 | 12/2002 | Marvin |
| 7,186,118 | B2 * | 3/2007 | Hansen ..................... B60R 7/04 296/24.34 |
| 7,868,585 | B2 * | 1/2011 | Sarnowsky ........... H02J 7/0042 320/108 |
| 8,490,846 | B1 * | 7/2013 | Wheatley ................ B60R 11/02 224/277 |
| 8,783,752 | B2 * | 7/2014 | Lambert ................. B60R 16/02 296/24.34 |

(Continued)

FOREIGN PATENT DOCUMENTS

| DE | 19845106 | 4/2000 | |
| JP | 10178563 | 6/1998 | |
| WO | WO-0056042 A1 * | 9/2000 | ............... A45F 5/02 |

*Primary Examiner* — Pinel E Romain
(74) *Attorney, Agent, or Firm* — Dinsmore & Shohl LLP (57) ABSTRACT

A vehicle console assembly includes a console housing including a storage compartment including a floor, a front wall, a rear wall and opposite side walls that extend between the front wall and the end wall defining a storage volume. A device charging tray includes a floor, a front wall, a rear wall and opposite side walls that extend between the front wall and the rear wall defining a storage volume. The device charging tray includes a raised support boss that extends out of the floor at the front wall. The raised support boss reduces a distance between the floor and an edge of the front wall. The raised support boss is located to support a mobile computing device positioned within the storage volume of the device charging tray spaced from the floor.

20 Claims, 7 Drawing Sheets

(56) References Cited

U.S. PATENT DOCUMENTS

| | | | |
|---|---|---|---|
| 8,807,621 B2* | 8/2014 | Stephan | B60R 7/06 |
| | | | 296/37.12 |
| 8,816,636 B2* | 8/2014 | Shinde | B60R 7/04 |
| | | | 320/108 |
| 9,350,839 B2* | 5/2016 | Lachnitt | H04M 1/04 |
| 9,387,808 B2* | 7/2016 | Kearney | B60R 7/04 |
| 9,455,595 B2* | 9/2016 | Jeon | H02J 7/0044 |
| 9,469,253 B2* | 10/2016 | Brunard | B60R 11/02 |
| 9,586,532 B1* | 3/2017 | Gough | B60R 11/0235 |
| 9,713,990 B2* | 7/2017 | Vanhelle | B60K 37/06 |
| 9,975,493 B2* | 5/2018 | Okinaga | B60R 7/04 |
| 2002/0100782 A1* | 8/2002 | Marvin | B60R 11/0241 |
| | | | 224/483 |
| 2003/0128840 A1* | 7/2003 | Luginbill | B60R 11/0241 |
| | | | 379/455 |
| 2016/0250981 A1* | 9/2016 | Felkins | B60R 11/02 |
| | | | 296/37.8 |
| 2018/0029536 A1* | 2/2018 | Murray | B60R 7/02 |
| 2018/0079369 A1* | 3/2018 | Catlin | B60R 11/0241 |
| 2018/0082086 A1* | 3/2018 | Birch | G06F 21/88 |
| 2018/0099621 A1* | 4/2018 | Vashi | B60R 11/02 |

* cited by examiner

VEHICLE CONSOLE ASSEMBLIES WITH DEVICE CHARGING TRAYS INCLUDING ELECTRONIC DEVICE SUPPORT FEATURES

TECHNICAL FIELD

The present specification generally relates to vehicle console assemblies and, more specifically, to vehicle console assemblies with charging trays including electronic device support features.

BACKGROUND

Console assemblies for vehicles come in many shapes and sizes and may contain any number of features. Some console assemblies may include entertainment and/or climate system controls, auxiliary power outlets, charging connections, and/or window controls. It is also not uncommon to provide a cup holder and/or storage compartment in a console assembly.

Some console assemblies may include storage locations where vehicle occupants store electronic devices, such as mobile phones. The size, shape and orientation of the storage locations can affect positioning of the mobile phones when they are located in the storage locations. While the storage locations may have a flat bottom on which the mobile phones can rest, it may be desirable to include electronic device support features that can be used to support the mobile phones within the storage locations in a predetermined orientation.

SUMMARY

In one embodiment, a vehicle console assembly includes a console housing including a storage compartment including a floor, a front wall, a rear wall and opposite side walls that extend between the front wall and the end wall defining a storage volume. A device charging tray includes a floor, a front wall, a rear wall and opposite side walls that extend between the front wall and the rear wall defining a storage volume. The device charging tray includes a raised support boss that extends out of the floor at the front wall of the device charging tray. The raised support boss reduces a distance between the floor and an edge of the front wall of the device charging tray. The raised support boss is located to support a mobile computing device positioned within the storage volume of the device charging tray spaced from the floor.

In another embodiment, a vehicle includes an instrument panel that is provided within a passenger compartment. The instrument panel extends in a vehicle lateral direction. A console assembly extends rearward away from the instrument panel in a vehicle longitudinal direction. The console assembly includes a console housing including a storage compartment including a floor, a front wall, a rear wall and opposite side walls that extend between the front wall and the end wall defining a storage volume. A device charging tray includes a floor, a front wall, a rear wall and opposite side walls that extend between the front wall and the rear wall defining a storage volume. The device charging tray includes a raised support boss that extends out of the floor at the front wall of the device charging tray. The raised support boss reduces a distance between the floor and an edge of the front wall of the device charging tray. The raised support boss is located to support a mobile computing device positioned within the storage volume of the device charging tray spaced from the floor.

In another embodiment, a method of supporting a mobile device in a console assembly of a vehicle comprising a device charging tray is provided. The method includes moving a moveable cover of a storage compartment of the console assembly from a closed configuration to an open configuration to expose the device charging tray located within a storage volume of a storage compartment. The device charging tray includes a floor, a front wall, a rear wall and opposite side walls that extend between the front wall and the rear wall defining a storage volume. The device charging tray includes a raised support boss that extends out of the floor at the front wall. A mobile computing device is placed in the storage volume of the device charging tray such that a portion of the mobile computing device is supported on the raised support boss above the floor of the device charging tray. A charger connector of a device charger is connected to a charging port of the mobile computing device. The charger connector extending through a notch in the front wall. The raised support boss supporting the mobile computing device above the floor such that the charger connector is located above a lower edge of the notch.

These and additional features provided by the embodiments described herein will be more fully understood in view of the following detailed description, in conjunction with the drawings.

BRIEF DESCRIPTION OF THE DRAWINGS

The embodiments set forth in the drawings are illustrative and exemplary in nature and not intended to limit the subject matter defined by the claims. The following detailed description of the illustrative embodiments can be understood when read in conjunction with the following drawings, where like structure is indicated with like reference numerals and in which:

DETAILED DESCRIPTION

Embodiments described herein generally relate to vehicles that include vehicle console assemblies including device charging trays with electronic device support features. The vehicles include a passenger compartment that includes an instrument panel and at least two seats: a driver seat and a passenger seat. The vehicle console assemblies may be located between the driver seat and the passenger seat and rearward of the instrument panel. The vehicle console assemblies may extend rearward from the instrument panel in a vehicle longitudinal direction. The vehicle console assemblies may be mounted between the driver seat and the passenger seat and immediately reward of the instrument panels so that a front portion of the vehicle console assemblies may be incorporated with the instrument panels.

The console assemblies may include a storage compartment located within a console housing of the console assemblies. The storage compartment can have a floor, a pair of sidewalls and a pair of end walls so as to define a storage volume. In some embodiments, the console assemblies may include a lid having a closed configuration that inhibits access to the storage volume and an open configuration that allows access to the storage volume. The console assemblies may also include the device charging tray. The device charging tray may be located within the storage volume of the storage compartment. As will be described in greater detail below, the device charging tray includes electronic device support features that can facilitate charging of a mobile computing device, such as a cellular smart phone, tablet computer, etc., located therein and reduce load on an electronic connector of a charging device connected to the electronic computing device.

Figure 1:
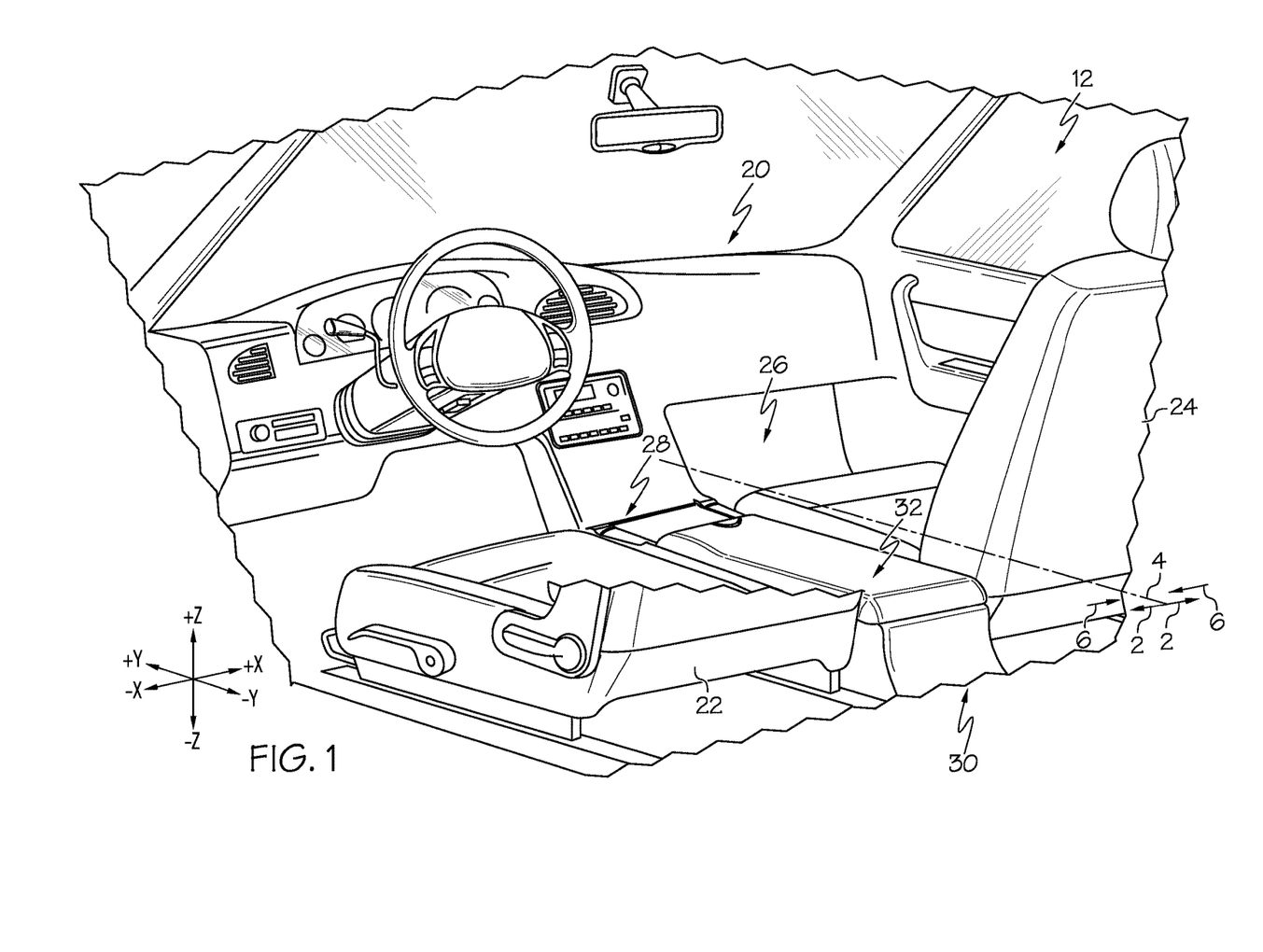
FIG. 1 is a perspective view of a passenger compartment of a vehicle including a console assembly according to one or more embodiments shown and described herein.

As used herein, the term "vehicle longitudinal direction" refers to the forward-rearward direction of the vehicle (i.e., in the +/− Y direction as depicted in FIG. 1). The term "vehicle lateral direction" refers to the cross-vehicle direction (i.e., in the +/− vehicle X direction depicted in FIG. 1), and is transverse to the vehicle longitudinal direction. The term "vehicle vertical direction" refers to the upward-downward direction of the vehicle (i.e., in the +/− vehicle Z direction depicted in FIG. 1). As used herein, "upper" and "above" are defined as the positive Z direction of the coordinate axis shown in the drawings. "Lower" and "below" are defined as the negative Z direction of the coordinate axis shown in the drawings.

The terms "outboard" or "outward" are used herein to refer to the relative location of a component in direction 2 with respect to a vehicle centerline 4, as shown in FIG. 1. The terms "inboard" or "inward" as used herein refer to the relative location of a component in direction 6 with respect to the vehicle centerline 4. Because the vehicle structures may be generally symmetrical about the vehicle centerline 4, the direction to which use of the terms "inboard," "inward," "outboard," and "outward" refer may be mirrored about the vehicle centerline 4 when evaluating components positioned along the opposite sides of the vehicle.

Referring to FIG. 1, a partial perspective view of a passenger compartment 12 of a vehicle 10 is depicted. The passenger compartment 12 includes a driver area and a passenger area. An instrument panel 20 is provided within the passenger compartment 12, extending across both the driver seat area and the passenger seat area. The instrument panel 20 generally extends in the vehicle lateral direction and includes, without limitation, an instrument cluster, a radio, and a climate control cluster including a plurality of individual vents. Further, the passenger compartment 12 includes a driver seat 22 and a front passenger seat 24. Located adjacent the driver seat 22 are various controls of the vehicle 10 such as, without limitation, a steering wheel, a gas pedal, and a brake pedal. It should be appreciated that the passenger compartment 12 may include a plurality of passenger seats rearward of the front passenger seat 24 in the vehicle longitudinal direction.

Generally, between the driver seat 22 and the front passenger seat 24 is a vehicle console assembly 26. The vehicle console assembly 26 generally extends in the vehicle longitudinal direction, extending from the instrument panel 20 ending at or slightly beyond a rear surface of the driver seat 22 and the front passenger seat 24. Further, the vehicle console assembly 26 generally extends in a vehicle lateral direction an equal distance outwardly from the vehicle centerline 14, limited in width by the distance between the driver seat 22 and the front passenger seat 24. The vehicle console assembly 26 includes a forward portion 28 and a rearward portion 30, the forward portion 28 being closer to the instrument panel 20 than the rearward portion 30. Disposed within the rearward portion 30 of the vehicle console assembly 26 is a storage compartment 32. The storage compartment 32 may be integrated with the vehicle console assembly 26. In some other embodiments, the storage compartment 32 may be separated or separately formed from the vehicle console assembly 26.

Figure 2:
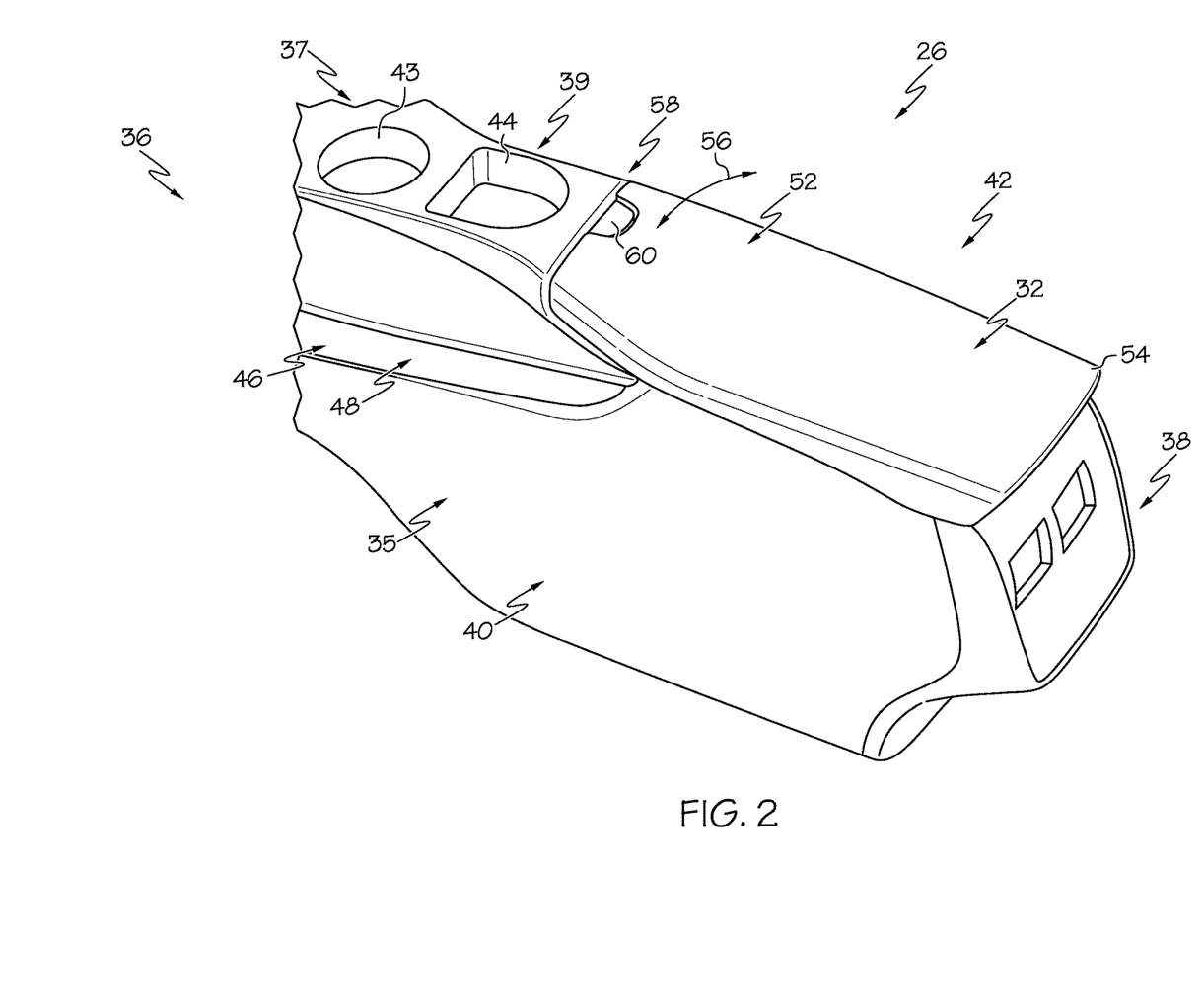
FIG. 2 is a perspective view of the console assembly of FIG. 1 according to one or more embodiments shown and described herein.

Referring to FIG. 2, the vehicle console assembly 26 is illustrated in isolation. The vehicle console assembly 26 includes a console housing 35 including a front end 36, a rear end 38 and opposite side ends 40 and 42 that extend between the front end 36 and the rear end 38 and are located on opposite sides of the centerline 14 (FIG. 1). At the front end 36 of the console housing 35, a pair of cup holders 37 and 39 is provided. In the illustrated embodiment, the cup holder 37 is located forward of the cup holder 39 in the vehicle longitudinal direction in a side-by-side arrangement. In some embodiments, the cup holder 37 may have a substantially circular perimeter 43, while the cup holder 39 may have the same or a different shaped perimeter 44, such as the truncated perimeter 44 illustrated by FIG. 2. A storage compartment 46 may be located adjacent the cup holders 37 and 39 in the vehicle lateral direction. The storage compartment 46 may extend alongside the cup holders 37 and 39 in the vehicle longitudinal direction. In some embodiments, the storage compartment 46 may have an open entrance 48 that allows for access to items placed within the storage compartment 46.

A primary storage compartment 50 is located rearward of the cup holders 37 and 39. In the example of FIG. 2, the primary storage compartment 50 is closed by a moveable cover 52. The moveable cover 52 may be hingedly attached to the console housing 35 at a rearward location 54 such that the moveable cover 52 can rotate in a direction of arrow 56 in rearward and forward directions between open and closed configurations, respectively. In some embodiments, a latch assembly, generally indicated by element 58, may be provided that includes a release button 60 or other release element (e.g., handle, lever, etc.) that can be used to latch and unlatch the moveable cover 52 while the moveable cover 52 is in the closed configuration. By actuating the release button 60, the moveable cover 52 can be moved from the illustrated closed configuration to the open configuration. In some embodiments, the moveable cover 52 may be moved manually. In other embodiment, the moveable cover 52 may be biased (e.g., by a spring) toward the open configuration. In yet some embodiments, an actuator (e.g., motor, piston, etc.) may be used to move the moveable cover 52 between the closed and open configurations.

Figure 3:
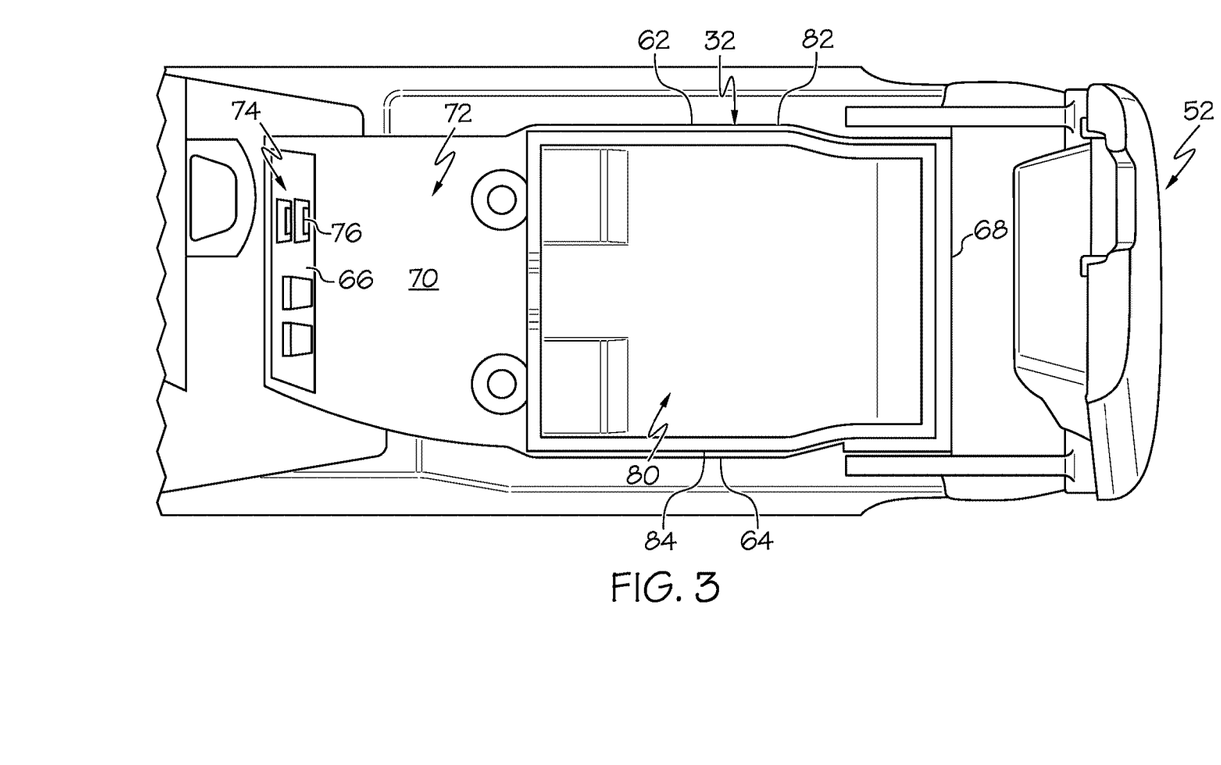
FIG. 3 is a top view of the console assembly of FIG. 2 in an open configuration according to one or more embodiments shown and described herein.

FIG. 3 illustrates the vehicle console assembly 26 with the moveable cover 52 in the open configuration, exposing the storage compartment 50 and allowing access into the storage compartment 50, such as for adding items to and removing items from the storage compartment 50. The storage compartment 50 has a front wall 66, a rear wall 68, a floor 70 and side walls 62 and 64 that extend between the front wall 66 and the rear wall 68 together defining a storage volume 72 that can be closed from access using the moveable cover 52. Located at the front wall 66 is a device charging station 74 that is also located within the storage volume 72. The device charging station 74 may include any number of suitable connections for connecting a device charger to a power source, such as USB ports 76. The USB ports 76 are provided for connecting to a suitable USB connector for supplying power therethrough.

A device charging tray 80 is located within the storage volume 72 of the storage compartment 50. In some embodiments, the side walls 62 and 64 each include a support ledge 82 and 84 that extends in the vehicle longitudinal direction that is arranged and located to support the device charging tray 80 above the floor 70 in a generally horizontal orientation. The device charging tray 80 is sized to receive a mobile computing device, such as a cellular smart phone, as will be described in greater detail below.

Figure 4:
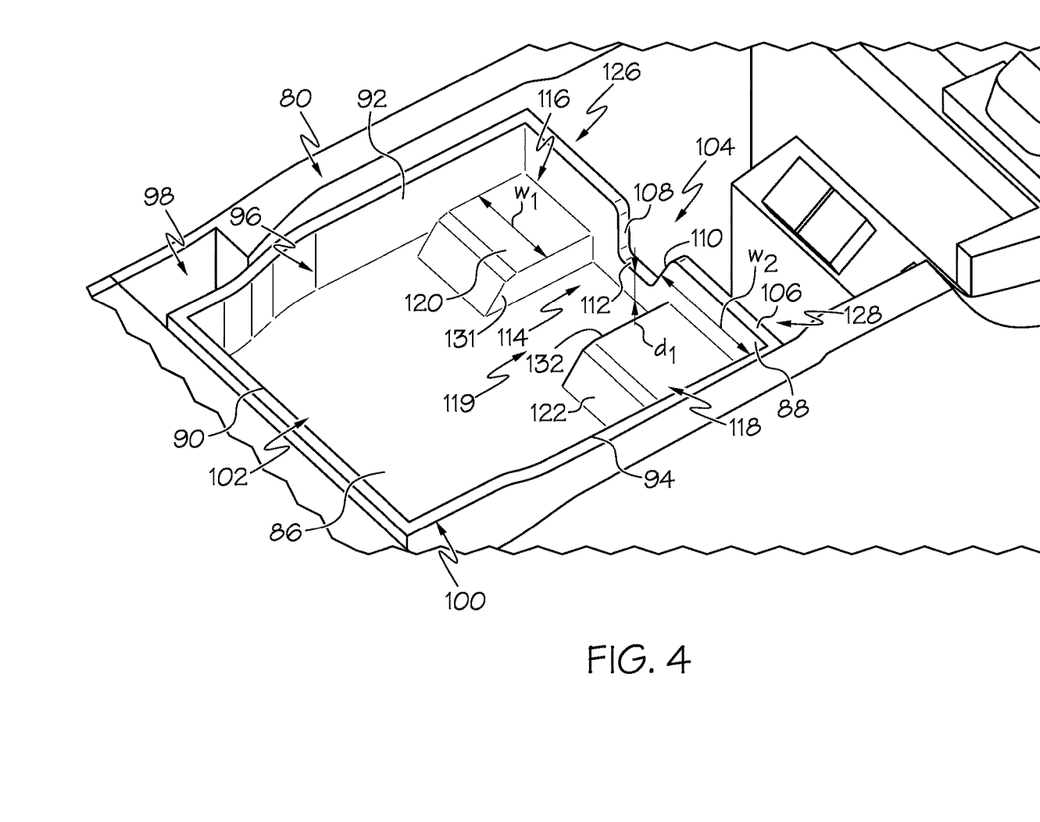
FIG. 4 is a perspective view of a device charging tray located in a storage compartment of the console assembly of FIG. 3 according to one or more embodiments shown and described herein.

Referring to FIG. 4, the device charging tray 80 includes a floor 86, a front wall 88, a rear wall 90 and side walls 92 and 94 that extend between the front wall 88 and the rear wall 90 to define a storage volume 96 that is sized to receive the mobile computing device. As represented by contoured regions 98 and 100, any of the walls 88, 90, 92 and 94 may be contoured to correspond to a contour of the storage volume 72 of the storage compartment 50. In the illustrated example, the contoured regions 98 and 100 provide the storage volume 96 of the device charging tray 80 with a region 102 of reduced width in the vehicle lateral direction. Such a shaped region 102 can also provide an interlocking arrangement that can be used to facilitate a desired placement of the device charging tray 80 within the storage volume 72 of the storage compartment 50. In some embodiments, for example, the device charging tray 80 may be removable from the storage volume 72 to provide increased access to items that may be located beneath the device charging tray 80 within the storage compartment 50.

A notch 104 is provided in the front wall 88. As can be seen, the notch 104 is formed as a recess that extends below an upper edge 106 of the front wall 88. The notch 104 may have side edges 108 and 110 and a lower edge 112 that extends between the side edges 108 and 110 in the vehicle lateral direction forming a U-shape. The lower edge 112 of the notch 104 is spaced vertically from the floor 86 a distance $d_1$ to provide the front wall 88 with a region 114 of reduced height. The lower edge 112 is spaced from the floor 86 providing the region 114 that extends outwardly from the floor 86, which can also be a barrier to inhibit unintended movement of contents through the notch 104 and out of the device charging tray 80.

The device charging tray 80 is provided with electronic device support features in the form of raised support bosses 116 and 118 that are located at opposite sides of the notch 104. Each raised support boss 116 and 118 extends outwardly from a plane of the floor 86 and has an upper support surface 120 that faces away from the floor 86 and a ramp portion 122 that extends from the upper support surface 120 to the floor 86 at an angle that is less than 90 degrees relative to the floor 86. The raised support bosses 116 and 118 each also have a width $w_1$ in the vehicle lateral direction. The widths $w_1$ may be the same or they may be different depending, for example, on the geometry of the device charging tray 80. In the illustrated embodiment, the widths $w_1$ are substantially the same. The raised support bosses 116 and 118 may extend in the vehicle lateral direction from their respective side wall 92 and 94 toward the notch 104, leaving a gap 119 between the raised support bosses 116 and 118.

The front wall 88 includes outboard wall portions 126 and 128 that are located at opposite sides of the notch 104. Each wall portion 126 and 128 has a width $w_2$ in the vehicle lateral direction extending from the side walls 92 and 94 to inboard edges 131 and 132 of the respective raised support bosses 116 and 118. In the illustrated embodiment, $w_1$ of the raised support bosses 116 and 118 are less than $w_2$ of the wall portions 126 and 128, which provides the raised support bosses 116 and 118 spaced-apart from one another in the vehicle lateral direction thereby exposing the region 114 of the support wall 88 of reduced height.

In some embodiments, the raised support bosses 116 and 118 are raised from the floor 86 a distance that is no less than the distance $d_1$ of the region 114 of reduced height. The distance $d_1$ may be substantially the same as the heights of the raised support bosses 116 and 118, or the heights of the raised support bosses 116 and 118 may be greater than the distance $d_1$. The heights may be selected to support at least a portion of a mobile computing device away from the floor 86 during use.

While the raised support bosses 116 and 118 are illustrated as somewhat box-shaped having a rectangular upper support surface 120 with the ramp portion 122, the raised support bosses may be any suitable shape, such as stepped, rounded and even irregular shapes so long as the raised support bosses support the mobile computing device spaced from the floor 86. In some embodiments, the raised support bosses 116 and 118 are integrally formed with the rest of the device charging tray 80 as a single, monolithic structure (e.g., by molding). In other embodiments, the raised support bosses may be separately formed and then attached to the floor 86 by any suitable method, such as adhesive, welding, fastening, etc.

Figure 5:
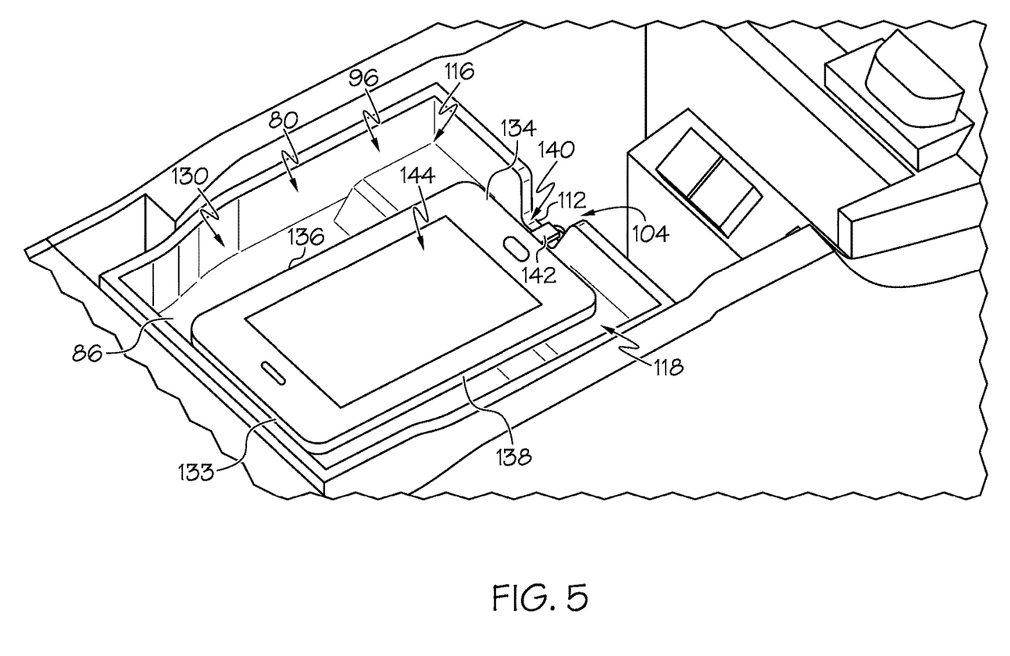
FIG. 5 is a perspective view of the device charging tray of FIG. 4 in use according to one or more embodiments shown and described herein.
Figure 6:
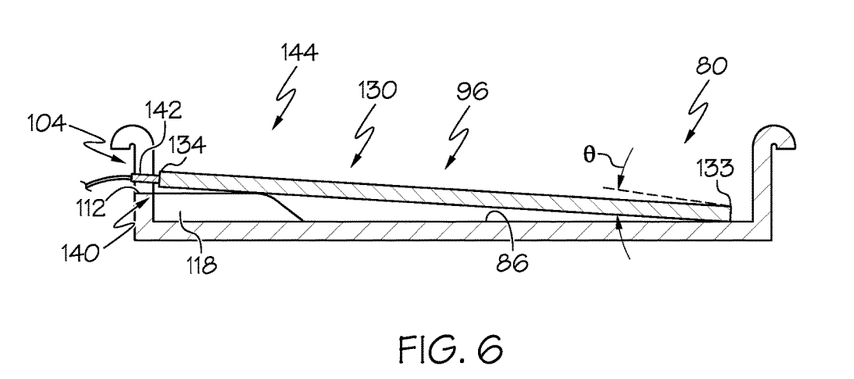
FIG. 6 is a schematic section view of the device charging tray of FIG. 5 in use according to one or more embodiments shown and described herein.

FIGS. 5 and 6 illustrate the device charging tray 80 in operation with a mobile computing device 130 located in the storage volume 96. The mobile computing device 130 includes an upper edge 133, a lower edge 134 and side edges 136 and 138 that extend between the upper edge 133 and the lower edge 134. In the illustrated example, the mobile computing device 130 includes a charging port, represented by element 140 that is located at the lower edge 134 of the mobile computing device 130. In other examples, the charging port may be located at the upper edge 133. Connected to the charging port 140 is a charger connector 142. As can be seen, the charger connector 142 extends outwardly from the charging port 140 and into the notch 104. The charger connector 142 may be any suitable charger connector, such as USB (mini, micro), coaxial, Lightning®, etc.

The mobile computing device 130 and the raised support bosses 116 and 118 are arranged such that a portion 144 of the mobile computing device 130 rests on the raised support bosses 116 and 118, thereby lifting the portion 144 of the mobile computing device 130 from the floor 86 of the device charging tray 80. As described above, because the heights of the raised support bosses 116 and 118 are at least equal to the height of the lower edge 112 from the floor 86, the charger connector 142 is spaced above the lower edge 112 of the notch 104, which can be desirable so that the charger connector 142 is not used to support the mobile computing device 130 within the device charging tray 80.

Figure 7:
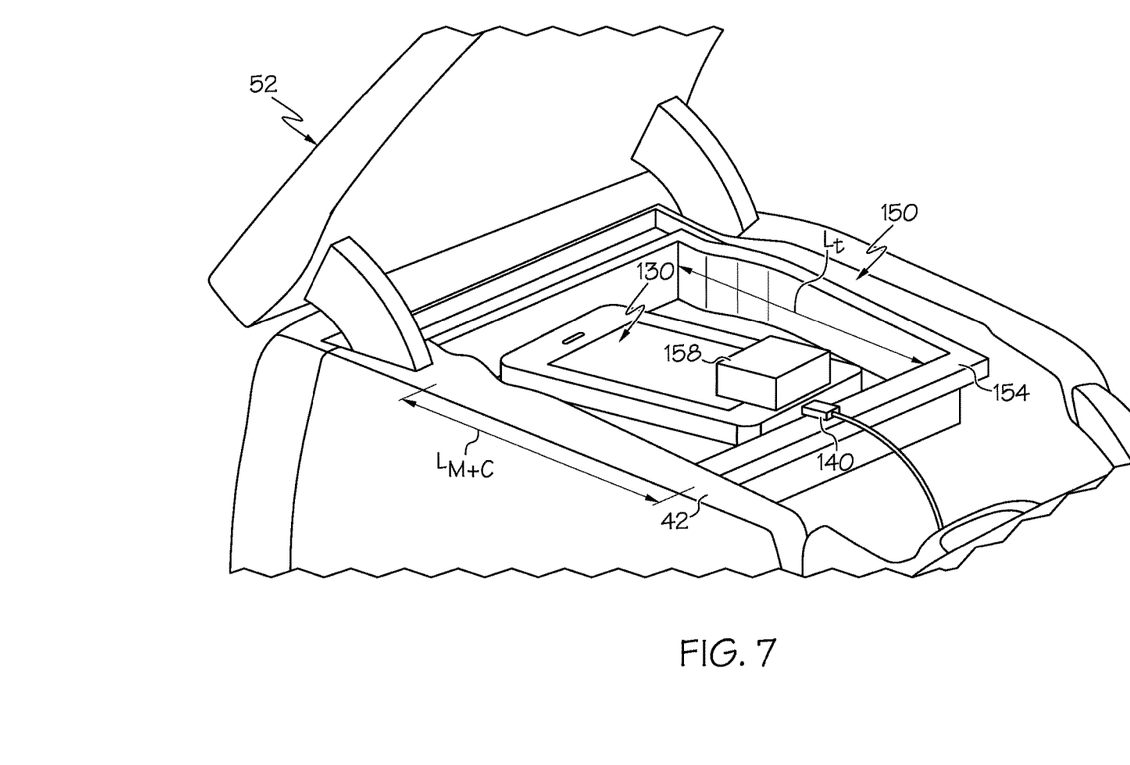
FIG. 7 is a perspective view of a console assembly including another embodiment of a device charging tray.

FIG. 7, for example, illustrates an embodiment of a device charging tray 150 without a notch or raised support bosses. Because a lengthwise dimension of the device charging tray 150 is only slightly longer than a lengthwise dimension of the mobile computing device 130, the charger connector 142 may extend over an edge 154 of the device charging tray 150. This is because a total length of the mobile computing device 130 plus the charger connector 142 $L_{m+c}$ is greater than a length $L_t$ of the device charging tray 150. Without any raised support bosses or other electronic device support features, the charger connector 142 is used to support at least a portion of the weight of the mobile computing device 130 thereby providing a stress at the connection between the charger connector 142 and the mobile computing device 130.

In some instances, a vehicle occupant may place an object 158 on the mobile computing device 130 with the mobile computing device 130 located in the device charging tray 150 and the charger connector 142 connected thereto. In the illustrated example, the object 158 is dimensioned such that the moveable cover 52 engages the object 158 as the moveable over is lowered into the closed configuration. As can be appreciated, moving the moveable cover 52 into the closed configuration while engaging the object 158 places an increased load on the charger connector 142 resting on the edge 154 of the device charging tray 150, This increased load may damage the charger connector 142 and/or the charging port 140 due to the increase shear load at the interface between the charger connector 142 and the charging port 140.

Referring back to FIG. 6, providing the raised support bosses 116 and 118 raises the lower edge 134 of the mobile computing device 130 so the charger connector 142 is spaced-above the lower edge 112 and is not supporting the weight of the mobile computing device 130 against the lower edge 112. Further, providing the notch 104 allows the lower edge 134 where the charger connector 142 is located to sit closer an angle θ to the floor 86 compared to an embodiment where the notch is absent, as shown in FIG. 7. The lower position of the lower edge 112 due to presence of the notch 104 can provide more distance between the mobile computing device 130 and a top edge of the device charging tray 150.

The above-described device charging trays include electronic device support features that are used to support electronic computing devices directly, as opposed to being supported by their charger connectors. A notch may be provided in a side wall of the device charging trays, which can allow the electronic computing devices to sit lower inside the storage volumes of the device charging trays, which provides more space above the electronic computing devices in the storage volume of the device charging trays. Providing more space above the electronic computing devices in the device charging trays can reduce a possibility that the moveable cover of the center console assembly will engage objects placed upon the mobile computing device and apply additional load thereon.

It is noted that the terms "substantially" and "about" may be utilized herein to represent the inherent degree of uncertainty that may be attributed to any quantitative comparison, value, measurement, or other representation. These terms are also utilized herein to represent the degree by which a quantitative representation may vary from a stated reference without resulting in a change in the basic function of the subject matter at issue.

While particular embodiments have been illustrated and described herein, it should be understood that various other changes and modifications may be made without departing from the spirit and scope of the claimed subject matter. Moreover, although various aspects of the claimed subject matter have been described herein, such aspects need not be utilized in combination. It is therefore intended that the appended claims cover all such changes and modifications that are within the scope of the claimed subject matter.

What is claimed is:

1. A vehicle console assembly comprising:
   a console housing comprising a storage compartment including a floor, a front wall, a rear wall and opposite side walls that extend between the front wall and the end wall defining a storage volume; and
   a device charging tray comprising a floor, a front wall, a rear wall and opposite side walls that extend between the front wall and the rear wall defining a storage volume, the device charging tray comprising a raised support boss that extends out of the floor nearer to the front wall of the device charging tray than the rear wall, the raised support boss reducing a distance between the floor and an edge of the front wall of the device charging tray, the raised support boss being located to support a mobile computing device positioned within the storage volume of the device charging tray spaced from the floor.

2. The vehicle console assembly of claim 1, wherein the raised support boss and the floor of the device charging tray are monolithic.

3. The vehicle console assembly of claim 1, wherein the raised support boss is a first raised support boss, the device charging tray comprising a second raised support boss that extends out of the floor at the front wall that is spaced from the first raised support boss providing a gap therebetween.

4. The vehicle console assembly of claim 3, wherein the front wall of the device charging tray includes a notch formed therein that is located at the gap providing a region of the front wall of the front charging tray of reduced distance from the floor, the edge of the front wall of the device charging tray being a lower wall of the notch.

5. The vehicle console assembly of claim 4, wherein the notch includes opposing side edges and the lower edge forming a U-shape, the lower edge being spaced from the floor of the device charging tray.

6. The vehicle console assembly of claim 5, wherein a distance from the floor to an upper support surface of the first raised support boss is no less than a distance from the floor to the lower edge of the notch.

7. The vehicle console assembly of claim 6, wherein the distance from the floor to the upper surface of the first raised support boss is substantially the same as a distance from the floor to an upper surface of the second raised support boss.

8. The vehicle console assembly of claim 4, wherein the first raised support boss extends outwardly from one of the side walls of the device charging tray to an inboard edge that is located outboard of the notch.

9. The vehicle console assembly of claim 8, wherein the second raised support boss extends outwardly from the other of the side walls of the device charging tray to an inboard edge that is located outboard of the notch.

10. A vehicle comprising:
    an instrument panel provided within a passenger compartment, the instrument panel extending in a vehicle lateral direction;
    a console assembly extending rearward away from the instrument panel in a vehicle longitudinal direction, the console assembly comprising:
    a console housing comprising a storage compartment including a floor, a front wall, a rear wall and opposite side walls that extend between the front wall and the end wall defining a storage volume; and
    a device charging tray comprising a floor, a front wall, a rear wall and opposite side walls that extend between the front wall and the rear wall defining a storage volume, the device charging tray comprising a raised support boss that extends out of the floor nearer the front wall of the device charging tray than the rear wall, the raised support boss reducing a distance between the floor and an edge of the front wall of the device charging tray, the raised support boss being located to support a mobile computing device positioned within the storage volume of the device charging tray spaced from the floor.

11. The vehicle of claim 10, wherein the raised support boss and the floor of the device charging tray are monolithic.

12. The vehicle of claim 10, wherein the raised support boss is a first raised support boss, the device charging tray comprising a second raised support boss that extends out of the floor at the front wall that is spaced from the first raised support boss providing a gap therebetween.

13. The vehicle of claim 12, wherein the front wall of the device charging tray includes a notch formed therein that is located at the gap providing a region of the front wall of the front charging tray of reduced distance from the floor, the edge of the front wall of the device charging tray being a lower wall of the notch.

14. The vehicle of claim 13, wherein the notch includes opposing side edges and the lower edge forming a U-shape, the lower edge being spaced from the floor of the device charging tray.

15. The vehicle of claim 14, wherein a distance from the floor to an upper support surface of the first raised support boss is no less than a distance from the floor to the lower edge of the notch.

16. The vehicle of claim 15, wherein the distance from the floor to the upper surface of the first raised support boss is substantially the same as a distance from the floor to an upper surface of the second raised support boss.

17. The vehicle of claim 13, wherein the first raised support boss extends outwardly from one of the side walls of the device charging tray to an inboard edge that is located outboard of the notch.

18. The vehicle of claim 17, wherein the second raised support boss extends outwardly from the other of the side walls of the device charging tray to an inboard edge that is located outboard of the notch.

19. A method of supporting a mobile device in a console assembly of a vehicle comprising a device charging tray, the method comprising:
    moving a moveable cover of a storage compartment of the console assembly from a closed configuration to an open configuration to expose the device charging tray located within a storage volume of a storage compartment, the device charging tray comprising:
        a floor, a front wall, a rear wall and opposite side walls that extend between the front wall and the rear wall defining a storage volume, the device charging tray comprising a raised support boss that extends out of the floor nearer the front wall than the rear wall;
    placing a mobile computing device in the storage volume of the device charging tray such that a portion of the mobile computing device is supported on the raised support boss above the floor of the device charging tray; and
    connecting a charger connector of a device charger to a charging port of the mobile computing device, the charger connector extending through a notch in the front wall, the raised support boss supporting the mobile computing device above the floor such that the charger connector is located above a lower edge of the notch.

20. The method of claim 19 further comprising connecting the device charger to a device charging station provided within the storage compartment.

* * * * *

UNITED STATES PATENT AND TRADEMARK OFFICE
CERTIFICATE OF CORRECTION

| | | |
|---|---|---|
| PATENT NO. | : 10,404,085 B2 | Page 1 of 1 |
| APPLICATION NO. | : 15/658969 | |
| DATED | : August 20, 2019 | |
| INVENTOR(S) | : Chae An | |

It is certified that error appears in the above-identified patent and that said Letters Patent is hereby corrected as shown below:

On the Title Page

Item [73], after "Manufacturing North", delete "ameica" and insert --America--, therefor.

Signed and Sealed this
Twenty-ninth Day of October, 2019

Andrei Iancu
*Director of the United States Patent and Trademark Office*